No. 621,867. Patented Mar. 28, 1899.
L. STOCKETT.
COFFEE POT.
(Application filed May 6, 1898.)
(No Model.)

Attest:
Arthur D. Greene
Chas. D. Greene Jr.

Inventor:
Lewis Stockett
by Benj. T. Rey
Atty.

THE NORRIS PETERS CO., PHOTO-LITHO., WASHINGTON, D. C.

UNITED STATES PATENT OFFICE.

LEWIS STOCKETT, OF GREAT FALLS, MONTANA.

COFFEE-POT.

SPECIFICATION forming part of Letters Patent No. 621,867, dated March 28, 1899.

Application filed May 6, 1898. Serial No. 679,899. (No model.)

*To all whom it may concern:*

Be it known that I, LEWIS STOCKETT, a citizen of the United States, residing at Great Falls, in the county of Cascade and State of Montana, have invented a new and useful Coffee-Pot, of which the following is a specification.

My invention relates to improvements in pots for making coffee. The well-known drip-coffee pots enable good coffee to be made; but where they are used only a small proportion of the strength of the ground coffee can be extracted. Where, on the other hand, coffee is boiled in the ordinary way, the strength is extracted; but coffee has to either be strained or settled, and its quality is seldom as good as it is where made in a drip-pot.

The object of my improvements is to provide a coffee-pot which will combine the advantages of a drip-pot with those of a pot of common form and be free from the disadvantages of either. I attain that object by the construction illustrated in the accompanying drawings, in which—

Figure 1:
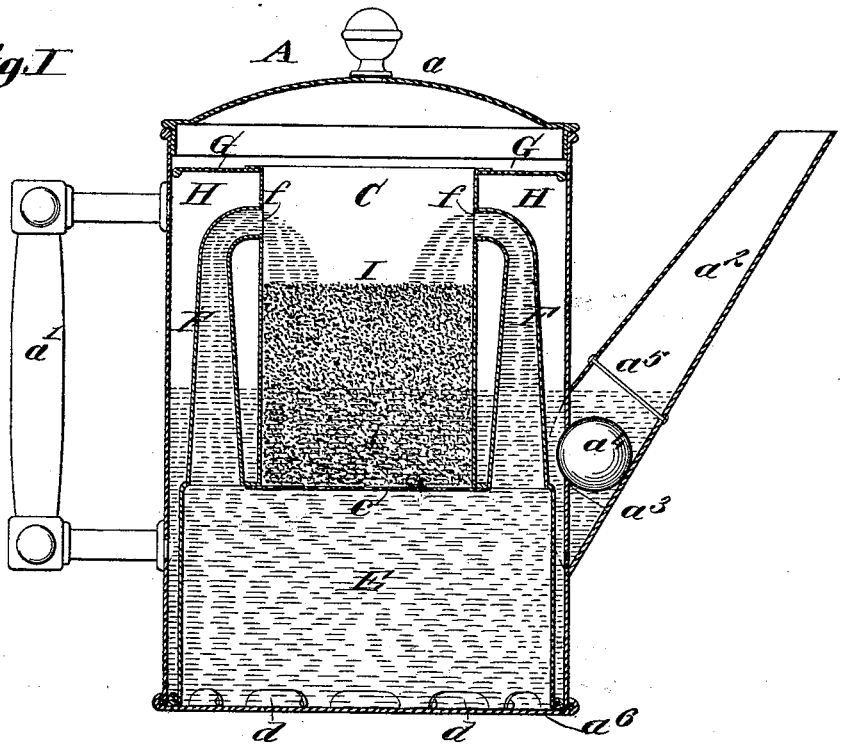
Figure 2:
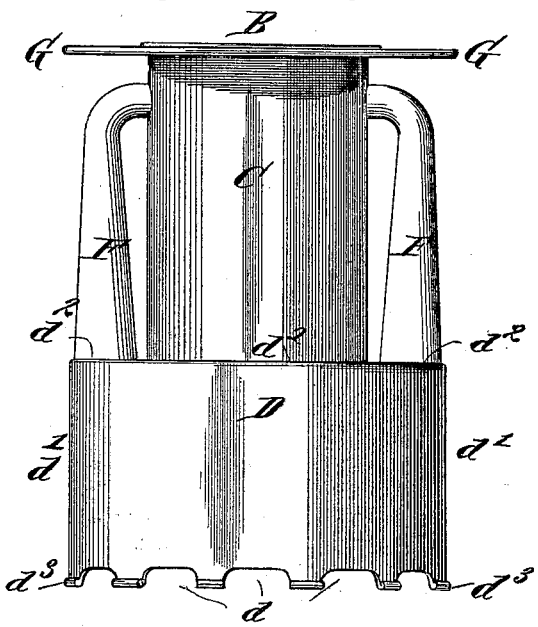

Figure 1 is a central vertical section of a coffee-pot embodying my improvements, and Fig. 2 is a detailed side elevation of a portion of the pot in which the process of coffee-making is chiefly carried on.

Similar letters refer to similar parts throughout both views.

A represents a coffee-pot having a lid $a$, a handle $a'$, and a spout $a^2$, enlarging toward its inner end, all of common form. The passage $a^3$, leading from the interior of the body of the pot A to the inside of the spout $a^2$, is preferably provided with a valve closing inward when the pot is in a vertical position and opening outward when the pot is tilted in pouring out coffee. I prefer to use a ball-valve $a^4$ for this purpose. I place the valve within the base of the spout $a^2$ and make it large enough to enable it to seat in the mouth of the passage $a^3$ and close said passage, but not large enough to fill the lower end of the spout. I limit its outward movement preferably by a wire $a^5$, stretched across the spout $a^2$ far enough from the valve-seat to allow the valve $a^4$ to roll off its seat when the coffee-pot is tipped forward, but close enough to said seat to prevent the valve from rolling far enough out to either stop up the spout or escape therefrom.

The pot A contains a portion B, which is preferably but not necessarily removable therefrom. When in place, it preferably rests on the bottom $a^6$ of said pot. It preferably contains a receptacle C for ground coffee, whose bottom is closed by a strainer $c$, which may be made of wire-gauze or any other suitable material. This bottom is designed to allow liquid to pass freely, while preventing the escape of ground coffee.

The receptacle C is supported by a casing D, whose bottom is preferably open and which is preferably provided with notches or scallops $d$ along its lower edge for the passage of liquid. This casing surrounds a chamber E, into which liquid passes from the receptacle C. Between the receptacle C and the sides $d'$ of said casing the top $d^2$ of the casing D is preferably closed, except where two opposite tubes F rise from it. The mouths $f$ of said tubes preferably discharge into the upper part of the receptacle C, substantially as shown. I prefer to use two of said tubes and to use tubes tapering upward or otherwise make their lower ends larger than their mouths; but neither said form nor the number of tubes mentioned is essential.

The top of the receptacle C is preferably surrounded by an annular flange G, extending out therefrom to or nearly to the surrounding sides of the pot A. Below the flange G there is a space H, preferably surrounding the receptacle C and the casing D and preferably communicating with the chamber E by means of the openings formed by the scallops or notches $d$. At the extreme lower edge of the casing a bead $d^3$ is preferably formed thereon, which preferably fits the interior of the bottom of the pot closely, as shown, so as to keep the part B from moving laterally, and it incidentally prevents the space H from extending quite to the bottom of the pot A, except at points where the scallops $d$ are located; but, as will be obvious, the latter point is immaterial.

In using my improved coffee-pot I first place in the receptacle C a suitable quantity of coarsely-ground coffee. I then pour boiling water into the receptacle C, put the lid $a$ on the pot, and set the pot on the stove to boil. The water poured into the receptacle C at once begins to filter through the strainer *c* in the bottom of the receptacle, which, while preventing the ground coffee from escaping, permits the liquid to pass. After passing through the strainer *c* the liquid passes into the chamber E in the bottom of the pot and if placed on a hot stove soon begins to boil. If the quantity of water used is sufficient, the water when it begins to boil freely will rise in the chamber E, and finding the paths of least resistance to be through the tubes F will pass up through them and be discharged down upon the ground coffee contained in the receptacle C in continuous streams. The boiling water thus discharged into the receptacle C will in whole or in part sink down through the bottom of said receptacle, and in that way a steady circulation of water is maintained. A few minutes' boiling will extract its strength from the ground coffee. The most delicious coffee may be economically prepared in this way, and as it does not require to be either strained or settled may be served as soon as it has been allowed to boil the proper length of time. When a coffee-pot embodying my improvements is tilted in the manner usual in pouring coffee, the valve $a^4$ rolls from its seat and allows the coffee to pass freely, and the coffee poured from the space surrounding the receptacle C and casing D is replaced as fast as it is poured out by coffee passing out through the openings *d* from the chamber E.

After using my pot the removable part B may be taken out in an instant, and all parts may be kept clean without difficulty.

I claim—

1. The combination in a coffee-pot, of an outer casing, having a closed bottom and a spout; a receptacle within said casing for ground coffee, having an outlet for liquid at the bottom thereof with a strainer across it; a boiling-chamber for liquid into which said receptacle discharges and whose sides are closed to a point below the level of the inner end of said spout; and whose top is closed from its sides, to the edges of said strainer, except as hereinafter stated; tubular means extending from the upper portion of said chamber to the upper portion of said receptacle for ground coffee, for conveying fluid from said boiling-chamber to the upper portion of said receptacle; a passage for the outward escape of liquid at the lower part of said chamber, and below the inner end of said spout; and means connecting said passage with said spout.

2. The combination in a coffee-pot, of a body portion having a spout whose inner end is connected, by an opening in the side of the body portion, with the interior thereof; a gravity-valve automatically closing said opening, when the pot is in a vertical position, and opening automatically when the pot is tilted, forward; a receptacle for ground coffee having an outlet for liquid at its lower end, with a strainer across it; a boiling-chamber for liquid, into which said receptacle discharges, and whose sides are closed to below the level of the inner end of said spout; tubular means for the passage of fluid from the upper portion of said chamber to the upper portion of said receptacle for coffee; means at the lower portion of said boiling-chamber, for the outward passage of liquid; and means for the passage of liquid escaping from the lower portion of said chamber, to the inner end of said spout, substantially as described.

LEWIS STOCKETT.

Witnesses:
F. C. PARK,
D. A. PRIOR.